US012598237B2

(12) United States Patent
Goel

(10) Patent No.: US 12,598,237 B2
(45) Date of Patent: Apr. 7, 2026

(54) METHODS, SYSTEMS, AND COMPUTER READABLE MEDIA FOR COMMUNICATING AND USING NETWORK FUNCTION (NF) SET IDENTIFIERS IN HIERARCHICAL NF REPOSITORY FUNCTION (NRF) DEPLOYMENTS

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 181 days.

(21) Appl. No.: 18/749,349

(22) Filed: Jun. 20, 2024

(65) Prior Publication Data

US 2025/0392647 A1 Dec. 25, 2025

(51) Int. Cl.
*G06F 15/173* (2006.01)
*H04L 41/0894* (2022.01)
*H04L 67/51* (2022.01)

(52) U.S. Cl.
CPC .......... *H04L 67/51* (2022.05); *H04L 41/0894* (2022.05)

(58) Field of Classification Search
CPC ............................ H04L 67/51; H04L 41/0894
See application file for complete search history.

(56) References Cited

U.S. PATENT DOCUMENTS

| | | |
|---|---|---|
| 10,833,938 B1 | 11/2020 | Rajput et al. |
| 10,856,158 B2 | 12/2020 | Mendoza et al. |
| 11,477,670 B2 | 10/2022 | Mendoza et al. |
| 11,558,732 B1 | 1/2023 | Malhotra et al. |
| 11,743,363 B1 | 8/2023 | Goel |
| 12,101,730 B2 | 9/2024 | Jayaramachar et al. |
| 12,452,137 B1 | 10/2025 | Jayaramachar et al. |

(Continued)

FOREIGN PATENT DOCUMENTS

| | | |
|---|---|---|
| EP | 4 243 379 B1 | 12/2024 |
| WO | WO 2023/229855 A1 | 11/2023 |

OTHER PUBLICATIONS

Intent to Grant for European Patent Application Serial No. 23157508.5 (Jul. 2, 2024).

(Continued)

*Primary Examiner* — Joseph R Maniwang
(74) *Attorney, Agent, or Firm* — Jenkins, Taylor & Hunt, P.A.

(57) ABSTRACT

A method for communicating and using network function (NF) set identifiers in hierarchical NF repository function (NRF) deployments includes storing, by a first regional NRF, NF set identifiers of producer NFs registered with the first regional NRF. The method further includes communicating, by the first regional NRF and to a root NRF, the NF set identifiers of the producer NFs registered with the first regional NRF. The method further includes storing, by the root NRF, the NF set identifiers of the producer NFs registered with the first regional NRF. The method further includes using, by the root NRF, the NF set identifiers of the producer NFs registered with the first regional NRF to perform target regional NRF selection when functioning as an intermediate forwarding NRF for requests from regional NRFs.

20 Claims, 10 Drawing Sheets

(56) References Cited

U.S. PATENT DOCUMENTS

| 2020/0296606 | A1 | 9/2020 | Mendoza et al. | |
| 2021/0064406 | A1 | 3/2021 | Engelhart | |
| 2021/0067480 | A1 | 3/2021 | Goel | |
| 2021/0067485 | A1 | 3/2021 | Goel | |
| 2021/0084508 | A1 | 3/2021 | Mendoza et al. | |
| 2021/0258861 | A1 | 8/2021 | Wang et al. | |
| 2021/0367854 | A1 | 11/2021 | Lee | |
| 2021/0385732 | A1 | 12/2021 | Reyes et al. | |
| 2022/0052989 | A1* | 2/2022 | Zhao | H04L 63/0807 |
| 2022/0191294 | A1 | 6/2022 | Yang | |
| 2022/0295384 | A1 | 9/2022 | Gupta et al. | |
| 2022/0295386 | A1 | 9/2022 | Lu et al. | |
| 2022/0322270 | A1 | 10/2022 | Srivastava et al. | |
| 2022/0346188 | A1 | 10/2022 | Malhotra | |
| 2022/0393971 | A1 | 12/2022 | Rodrigo et al. | |
| 2023/0007536 | A1 | 1/2023 | Sharma | |
| 2023/0032054 | A1 | 2/2023 | Jayaramachar | |
| 2023/0284292 | A1 | 9/2023 | Hellgren et al. | |
| 2023/0292274 | A1 | 9/2023 | Jayaramachar et al. | |
| 2023/0396498 | A1* | 12/2023 | Singh | H04L 67/51 |
| 2023/0413214 | A1 | 12/2023 | Khare | |
| 2024/0023047 | A1* | 1/2024 | Gupta | H04W 60/04 |
| 2024/0137290 | A1 | 4/2024 | Alvarez Dominguez et al. | |
| 2024/0364595 | A1* | 10/2024 | Tian | H04L 41/12 |
| 2025/0008421 | A1* | 1/2025 | Hallenstal | H04W 24/02 |

OTHER PUBLICATIONS

Notice of Allowance for U.S. Appl. No. 18/677,181 (Sep. 26, 2025).

Commonly-Assigned, co-pending U.S. Appl. No. 18/677,181 for "Methods, Systems, and Computer Readable Media for Providing for Networktopology Learning By Service Communication Proxy (SCP) Using Root Networkfunction (NF) Repository Function (NRF)" (Unpublished, filed May 29, 2024).

"3rd Generation Partnership Project; Technical Specification Group Services and System Aspects; System Architecture for the 5G System (5GS); Stage 2 (Release 18)" 3GPP TS 23.501, V18.5.0 (Mar. 2024).

"3rd Generation Partnership Project; Technical Specification Group Core Network and Terminals; 5G System; Network Function Repository Services; Stage 3 (Release 18)", 3GPP TS 29.510, V18.6.0 (Mar. 2024).

Notice of Allowance for U.S. Appl. No. 17/689,777 (May 13, 2024).

"3rd Generation Partnership Project; Technical Specification Group Core Network and Terminals; 5G System; Network Function Repository Services; Stage 3 (Release 16)", 3GPP TS 29.510, V16.10.0 (Dec. 2021).

Extended European Search Report for European Patent Application Serial No. 23157508.5 (Jul. 19, 2023).

Notice of Publication for European Patent Application Serial No. 23157508.5 (Aug. 17, 2023).

"3rd Generation Partnership Project; Technical Specification Group Core Network and Terminals; 5G System; Network Function Repository Services; Stage 3 (Release 16)," 3GPP TS 29.510, V16.5.0, pp. 1-209 (Nov. 2020).

Notice of Allowance and Fee(s) Due for U.S. Appl. No. 17/751,584 (Jul. 14, 2023).

Applicant-Initiated Interview Summary for U.S. Appl. No. 17/751,584 (Jul. 3, 2023).

Non-Final Office Action for U.S. Appl. No. 17/751,584 (Mar. 29, 2023).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

Decision to Grant for European Patent Application Serial No. 23157508.5 (Nov. 7, 2024).

* cited by examiner

METHODS, SYSTEMS, AND COMPUTER READABLE MEDIA FOR COMMUNICATING AND USING NETWORK FUNCTION (NF) SET IDENTIFIERS IN HIERARCHICAL NF REPOSITORY FUNCTION (NRF) DEPLOYMENTS

TECHNICAL FIELD

The subject matter described herein relates to hierarchical NRF deployments. More particularly, the subject matter described herein relates to communicating NF set identifiers to a root NRF in a hierarchical NRF deployment and using the NF set identifiers for target NRF selection in intermediate NRF forwarding.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In some network architectures, NRFs are hierarchically deployed. In one example a hierarchical NRF deployment, regional NRFs serve different regions in an operator's network. Producer NFs in each region register with the regional NRFs. A top level NRF, referred to as the root NRF, operates as an intermediate forwarding NRF to forward SBI request messages to the regional NRFs.

To enable the root NRF to forward SBI request messages to the correct regional NRFs, the regional NRFs register with the root NRF, and, as part of the registration, the regional NRFs provide NrfInfo structures to the root NRF. The NrfInfo structures each include UdrInfo, UdmInfo, AusfInfo, AmfInfo, SmfInfo, UpfInfo, PcfInfo, BsfInfo, ChfInfo, NefInfo, NwdafInfo, PcscfInfo, and other producer NF info attributes of producer NFs registered with or whose attributes are configured with each regional NRF. The regional NRFs also update these producer NF info attributes with the root NRF using NF update, NF heart-beat, and NF status notify request messages. The producer NF info attributes contain a subset of the NF profile attributes of a producer NF instance.

One NF profile attribute that is lacking from the producer NF info attributes is the NF set Id of a producer NF instance. The NF set Id identifies an NF set of which a producer NF instance is a member. Producer NF instances that are part of the same NF set share state information and can thus take over processing for each other in the event of a failure of one member of the NF set. Because the root NRF lacks NF set information for the producer NF instances in each region, the root NRF may forward NRF an NF discovery, access token, or NF status subscribe request message to a regional NRF in a region in which producer NF that are members of the NF set identified in the NF discovery, access token, or NF status subscribe request are not located. When the regional NRF receives the NF discovery, access token, or NF status subscribe request including the NF set identifier, the regional NRF may determine that it does not support any producer NFs corresponding to the NF set identifier in the NF discovery, access token, or NF status subscribe request and will respond accordingly. As a result, session continuity can be broken, and the root NRF will be required to send the NF discovery, NF status subscribe, or access token request to another regional NRF. Requiring the root NRF to repeatedly try to send NF discovery, NF status subscribe, or access token requests to different regional NRFs to locate a regional NRF with which producer NFs corresponding to the NF set ID are registered is inefficient and increases transaction latency.

As a result, there exists a need for methods, systems, and computer readable media for communicating producer NF set information to a root NRF in hierarchical NRF deployments.

SUMMARY

A method for communicating and using network function (NF) set identifiers in hierarchical NF repository function (NRF) deployments includes storing, by a first regional NRF, NF set identifiers of producer NFs registered with the first regional NRF. The method further includes communicating, by the first regional NRF and to a root NRF, the NF set identifiers of the producer NFs registered with the first regional NRF. The method further includes storing, by the root NRF, the NF set identifiers of the producer NFs registered with the first regional NRF. The method further includes using, by the root NRF, the NF set identifiers of the producer NFs registered with the first regional NRF to perform target regional NRF selection when functioning as an intermediate forwarding NRF for requests from regional NRFs.

According to another aspect of the subject matter described herein, the method for communicating and using NF set identification information includes receiving, by the first regional NRF, NF register request messages from producer NFs located in a region served by the first regional NRF, reading NF profiles including the NF set identifiers from the NF register request messages, and storing, by the first regional NRF, the NF set identifiers includes storing the NF profiles in memory of the first regional NRF.

According to another aspect of the subject matter described herein, communicating the NF set identifiers to the root NRF comprises generating, by the first regional NRF, an NF register request message, adding, by the first regional NRF, the NF set identifiers to the NF register request message, and transmitting, by the first regional NRF and to the root NRF, the NF register request message including the NF set identifiers.

According to another aspect of the subject matter described herein, communicating the NF set identifiers to the root NRF comprises generating, by the first regional NRF, an NF update or NF heart-beat request message, adding, by the first regional NRF, the NF set identifiers to the NF update or NF heart-beat request message, and transmitting, by the first regional NRF and to the root NRF, the NF update or NF heart-beat request message including the NF set identifiers.

According to another aspect of the subject matter described herein, communicating the NF set identifiers to the root NRF comprises generating, by the first regional NRF, an NF status notify request message, adding, by the first regional NRF, the NF set identifiers to the NF status notify request message, and transmitting, by the first regional NRF and to the root NRF, the NF status notify request message including the NF set identifiers.

According to another aspect of the subject matter described herein, communicating the NF set identifiers to the root NRF includes generating an nfSetIdList including the NF set identifiers, embedding the nfSetIdList in an NrfInfo structure, adding the NrfInfo structure to a request message to be transmitted to the root NRF, and transmitting the request message including the NrfInfo structure from the first regional NRF to the root NRF.

According to another aspect of the subject matter described herein, communicating the NF set identifiers to the root NRF includes generating an nfSetIdList including the NF set identifiers, embedding the nfSetIdList in a custom structure, adding the custom structure to a request message to be transmitted to the root NRF and transmitting the request message including the custom structure from the first regional NRF to the root NRF.

According to another aspect of the subject matter described herein, using, by the root NRF, the NF set identifiers of the producer NFs registered with the first regional NRF to perform target regional NRF selection when functioning as an intermediate forwarding NRF for requests from regional NRFs includes receiving, by the root NRF, an NF discovery request message from a second regional NRF, the NF discovery request message including, as a query parameter, an NF set identifier, determining, by the root NRF and using the NF set identifier in the NF discovery request message and the NF set identifiers received from the first regional NRF, that a producer NF registered with the first regional NRF is a member of an NF set corresponding to the NF set identifier received in the NF discovery request message, and forwarding, by the root NRF, the NF discovery request message to the first regional NRF.

According to another aspect of the subject matter described herein, using, by the root NRF, the NF set identifiers of the producer NFs registered with the first regional NRF to perform target regional NRF selection when functioning as an intermediate forwarding NRF for requests from regional NRFs includes receiving, by the root NRF, an access token request message from a second regional NRF, the access token request message including an NF set identifier, determining, by the root NRF and using the NF set identifier in the access token request message and the NF set identifiers received from the first regional NRF, that a producer NF registered with the first regional NRF is a member of an NF set corresponding to the NF set identifier received in the access token request message, and forwarding, by the root NRF, the access token request message to the first regional NRF.

According to another aspect of the subject matter described herein, using, by the root NRF, the NF set identifiers of the producer NFs registered with the first regional NRF to perform target regional NRF selection when functioning as an intermediate forwarding NRF for requests from regional NRFs includes receiving, by the root NRF, an NF status subscribe request message from a second regional NRF, the NF status subscribe request message including, as a subscription identifying parameter, an NF set identifier, determining, by the root NRF and using the NF set identifier in the NF status subscribe request message and the NF set identifiers received from the first regional NRF, that a producer NF registered with the first regional NRF is a member of an NF set corresponding to the NF set identifier received in the NF status subscribe request message, and forwarding, by the root NRF, the NF status subscribe request message to the first regional NRF.

According to another aspect of the subject matter described herein, a system for communicating and using NF set identifiers in hierarchical NRF deployments is provided. The system includes a first regional NRF including at least one processor and a memory, the first regional NRF for storing, in the memory, NF set identifiers of producer NFs registered with the first regional NRF and communicating the NF set identifiers of the producer NFs registered with the first regional NRF. The system further includes a root NRF including at least one processor and a memory, the root NRF for receiving, from the first regional NRF, the NF set identifiers of the producer NFs registered with the first regional NRF and using the NF set identifiers of the producer NFs registered with the first regional NRF to perform target regional NRF selection when functioning as an intermediate forwarding NRF for requests from regional NRFs.

According to another aspect of the subject matter described herein, the first regional NRF is configured to communicate the NF set identifiers to the root NRF by generating an NF register request message, adding the NF set identifiers to the NF register request message, and transmitting, to the root NRF, the NF register request message including the NF set identifiers.

According to another aspect of the subject matter described herein, the first regional NRF is configured to communicate the NF set identifiers to the root NRF by generating an NF update or NF heart-beat request message, adding the NF set identifiers to the NF update or NF heart-beat request message, and transmitting, to the root NRF, the NF update or NF heart-beat request message including the NF set identifiers.

According to another aspect of the subject matter described herein, the first regional NRF is configured to communicate the NF set identifiers to the root NRF by generating an NF status notify request message, adding the NF set identifiers to the NF status notify request message, and transmitting, to the root NRF, the NF status notify request message including the NF set identifiers.

According to another aspect of the subject matter described herein, the first regional NRF is configured to communicate the NF set identifiers to the root NRF by generating an nfSetIdList including the NF set identifiers, embedding the nfSetIdList in an NrfInfo structure, adding the NrfInfo structure to a request message to be transmitted to the root NRF and transmitting the request message including the NrfInfo structure from the first regional NRF to the root NRF.

According to another aspect of the subject matter described herein, the first regional NRF is configured to communicate the NF set identifiers to the root NRF by generating an nfSetIdList including the NF set identifiers, embedding the nfSetIdList in a custom structure, adding the custom structure to a request message to be transmitted to the root NRF and transmitting the request message including the custom structure from the first regional NRF to the root NRF.

According to another aspect of the subject matter described herein, the root NRF is configured to use the NF set identifiers of the producer NFs registered with the first regional NRF to perform target regional NRF selection when functioning as an intermediate forwarding NRF for requests from regional NRFs by receiving, by the root NRF, an NF discovery request message from a second regional NRF, the NF discovery request message including, as a query parameter, an NF set identifier, determining, by the root NRF and using the NF set identifier in the NF discovery request message and the NF set identifiers received from the first regional NRF, that a producer NF registered with the first regional NRF is a member of an NF set corresponding to the NF set identifier received in the NF discovery request message, and forwarding, by the root NRF, the NF discovery request message to the first regional NRF.

According to another aspect of the subject matter described herein, the root NRF is configured to use the NF set identifiers of the producer NFs registered with the first regional NRF to perform target regional NRF selection when functioning as an intermediate forwarding NRF for requests from regional NRFs by receiving an access token request message from a second regional NRF, the access token request message including an NF set identifier, determining, using the NF set identifier in the access token request message and the NF set identifiers received from the first regional NRF, that a producer NF registered with the first regional NRF is a member of an NF set corresponding to the NF set identifier received in the access token request message, and forwarding the access token request message to the first regional NRF.

According to another aspect of the subject matter described herein, the root NRF is configured to use the NF set identifiers of the producer NFs registered with the first regional NRF to perform target regional NRF selection when functioning as an intermediate forwarding NRF for requests from regional NRFs by receiving an NF status subscribe request message from a second regional NRF, the NF status subscribe request message including, as a subscription identifying parameter, an NF set identifier, determining, using the NF set identifier in the NF status subscribe request message and the NF set identifiers received from the first regional NRF, that a producer NF registered with the first regional NRF is a member of an NF set corresponding to the NF set identifier received in the NF status subscribe request message, and forwarding the NF status subscribe request message to the first regional NRF.

According to another aspect of the subject matter described herein, a non-transitory computer readable medium having stored thereon computer-executable instructions that when executed by a processor of a computer control the computer to perform steps is provided. The steps include storing, by a first regional network function (NF) repository function (NRF), NF set identifiers of producer NFs registered with the first regional NRF. The steps further include communicating, by the first regional NRF and to a root NRF, the NF set identifiers of the producer NFs registered with the first regional NRF. The steps further include storing, by the root NRF, the NF set identifiers of the producer NFs registered with the first regional NRF. The steps further include using, by the root NRF, the NF set identifiers of the producer NFs registered with the first regional NRF to perform target regional NRF selection when functioning as an intermediate forwarding NRF for requests from regional NRFs.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
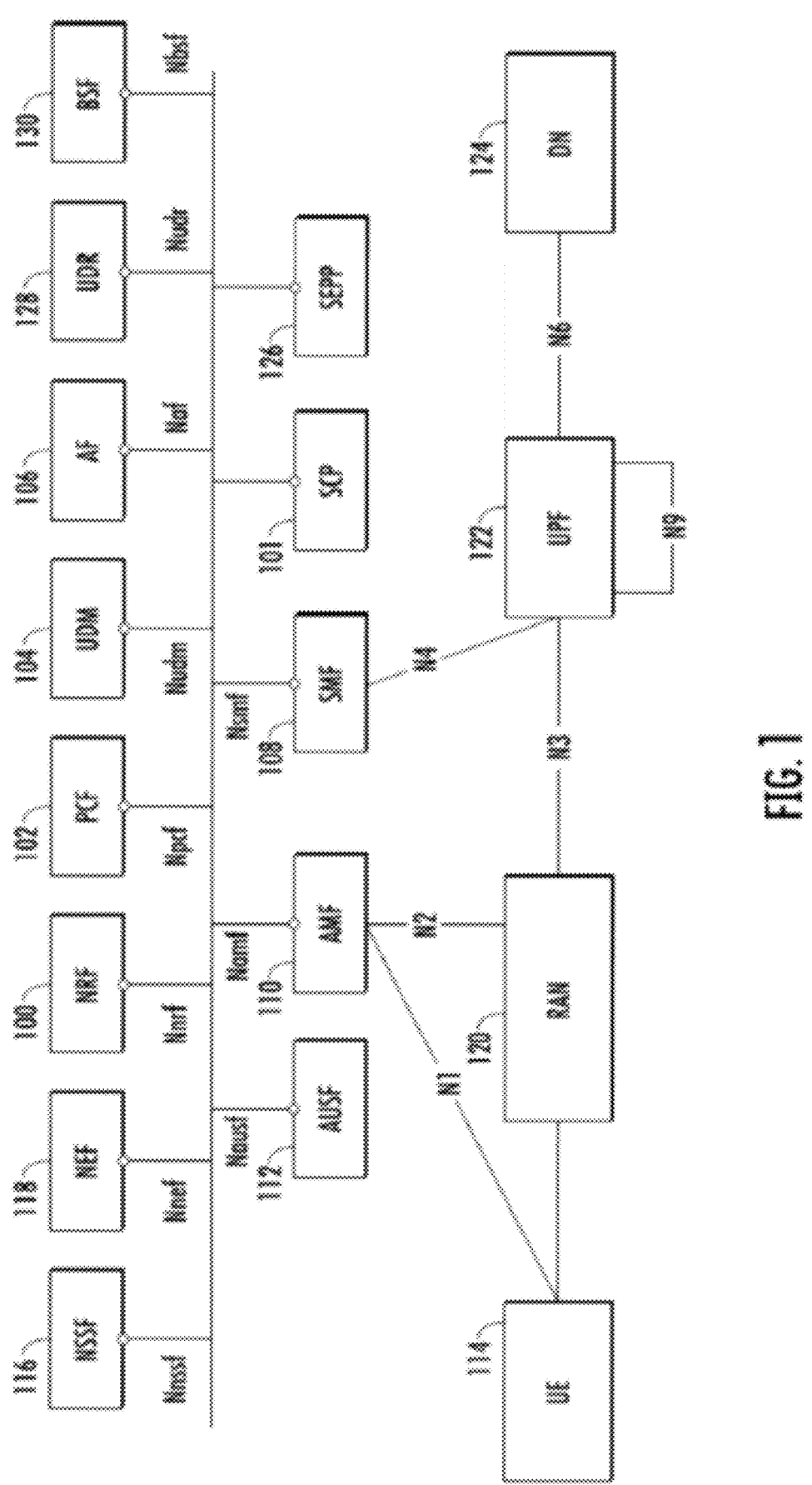
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

In hierarchical NRF deployments, a regional NRF provides management, discovery and access-token services to regional NFs. A root NRF registers regional NRFs and global NFs. The root NRF assists regional NRFs with management, discovery and access-token services by forwarding service requests to applicable regional NRFs. The root NRF provides the functionality specified for an intermediate forwarding NRF in 3GPP TS 29.510.

An NF set identifier is a globally unique identifier of a set of equivalent and interchangeable control plane (CP) NFs from a given network that provide distribution, redundancy and scalability (see clause 5.21.3 of 3GPP TS 23.501).

As used herein, the term "state data" refers to data learned by NRFs (both regional and root) from NF registrations/updates/heart-beats/and NF status notifications. Regional NRFs prepare their state data from NF registrations/updates/heart-beats/and subscriptions by regional NFs. Root NRFs prepare their state data from NF registrations/updates/heart-beats/and subscriptions by regional NRFs and global NFs.

Currently, as per 3GPP specifications (i.e., 3GPP TS 29.510), NRFs in a hierarchy exhibit the following behaviors. Regional NFs register with regional NRFs. Regional NRFs register/update/heart-beat with the root NRF. Regional NRFs share XXXInfo/XXXInfoList attributes that NFs have registered in the NF updates to the root NRF, where XXX depends on the type of NF. For example, XXX for a UDM would be "UDM", and XXX for an AMF would be "AMF". The regional NRF forwards requests-discovery, subscriptions and access-token that it cannot serve from its own state data to the root NRF. The root NRF serves at the top of the hierarchy. The root NRF prepares state data from the NF updates received from regional NRFs. For all requests forwarded to the root NRF from a regional NRF, the root NRF uses its state data to determine the target regional NRF that may serve the request.

Figure 2:
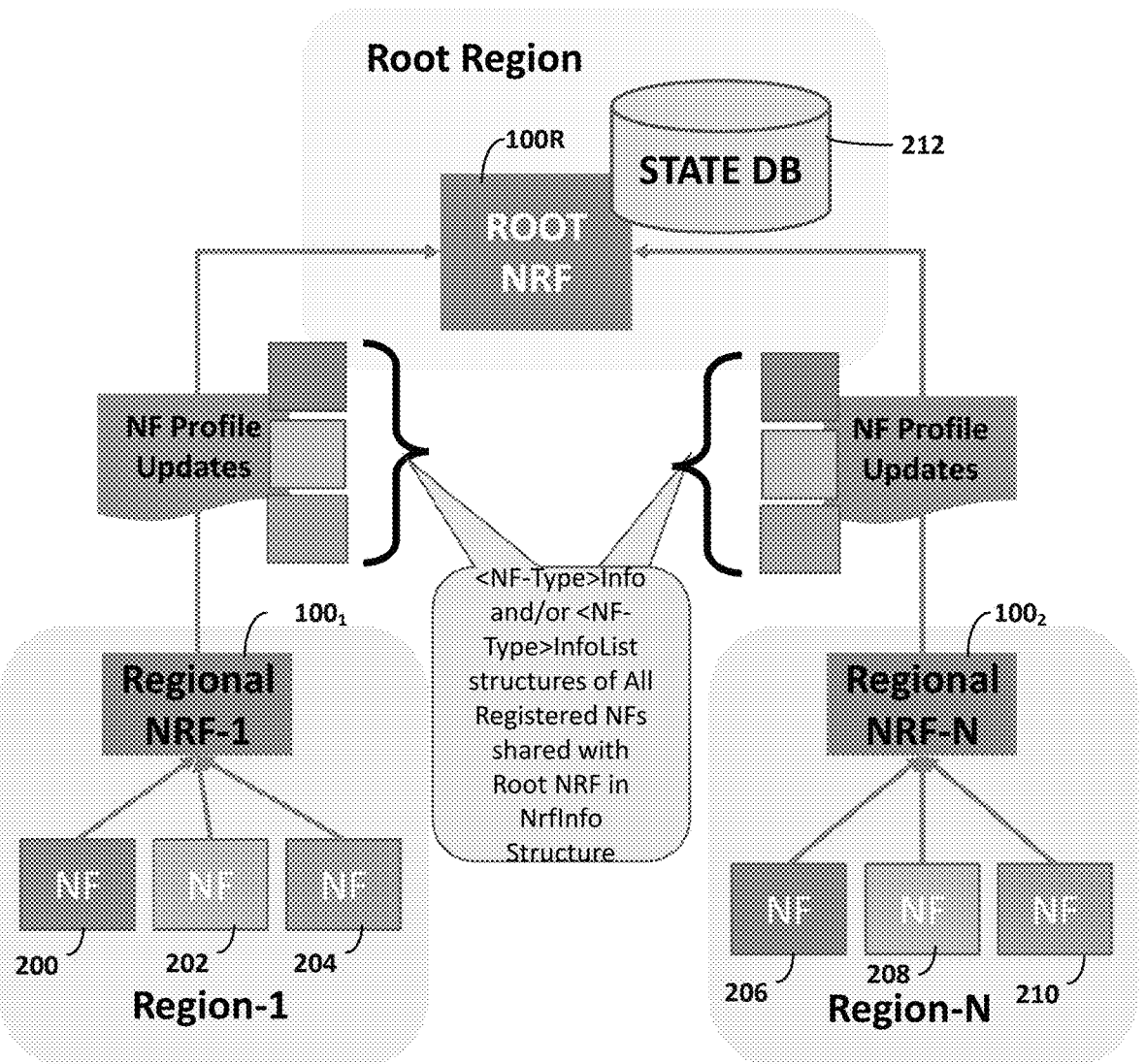
FIG. 2 is a network diagram illustrating an exemplary hierarchical NRF deployment.

FIG. 2 is a network diagram illustrating an exemplary hierarchical NRF deployment. Referring to FIG. 2, regional NRF $100_1$ receives NF registrations, heart-beats, updates, and status notifications from NFs 200, 202, and 204. Regional NRF $100_2$ receives registrations, heart-beats, and updates from NFs 206, 208, and 210. Regional NRFs $100_1$ and $100_2$ provide NF profile updates to root NRF 100R. However, the NF profile updates are limited to the XXXInfo and XXXInfoList attributes described in the preceding paragraph and do not include NF set identification information. Root NRF 100R stores the state information in an NF profiles/state database 212.

Figure 3:
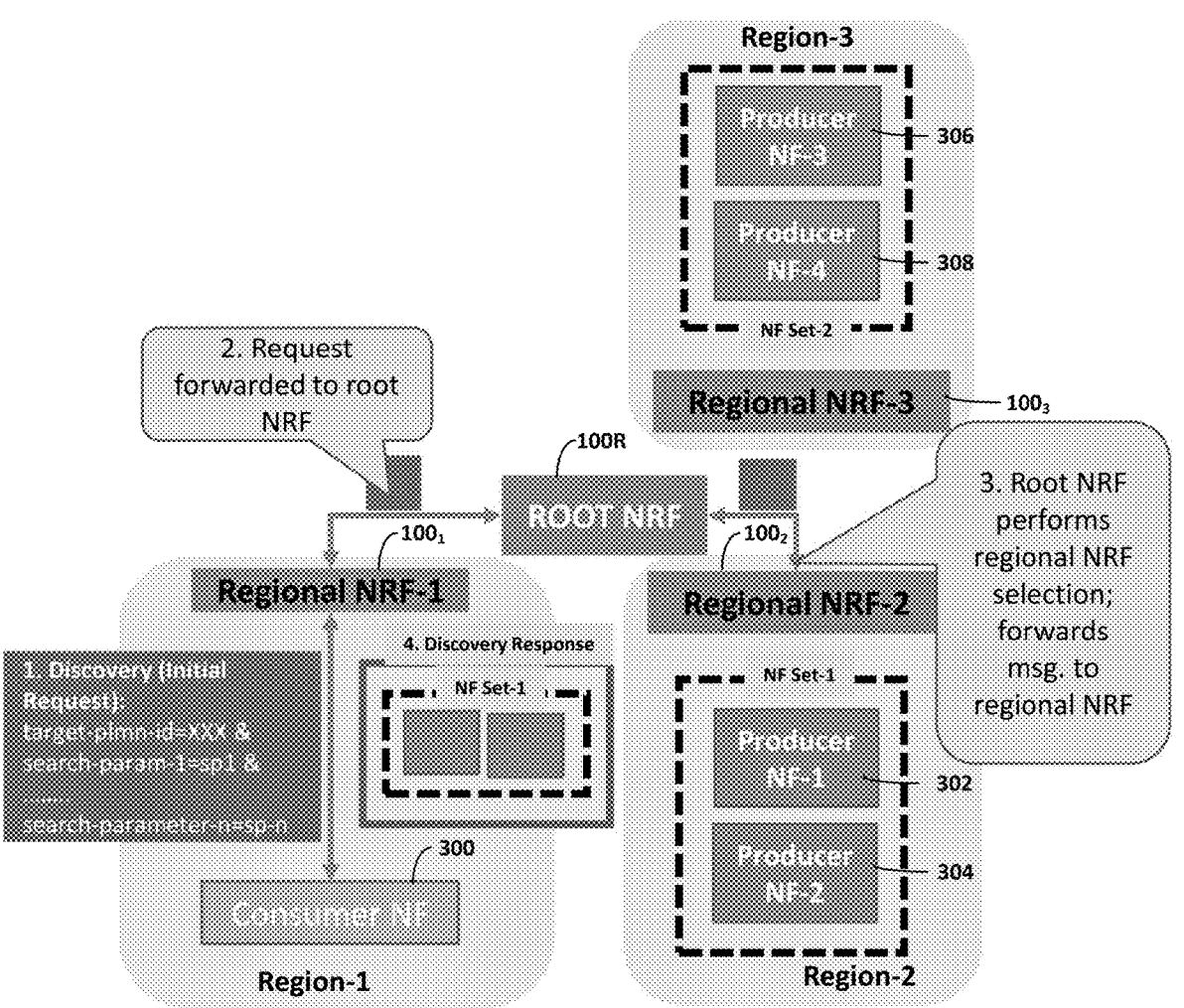
FIG. 3 is a network diagram illustrating an exemplary hierarchical NRF deployment and the processing of an initial NF discovery request message.

The root NRF's capability to determine a target regional NRF that may serve a request is limited to the content of <NF-Type>Info/<NF-Type>InfoList structures received from regional NRFs. FIG. 3 is a network diagram illustrating an exemplary hierarchical NRF deployment and the processing of an initial NF discovery request message. In FIG. 3, regional NRF $100_1$ serves region 1, which includes consumer NF 300. Regional NRF $100_2$ serves region 2, which includes producer NFs 302 and 304. Regional NRF $100_3$ serves region 3, which includes producer NFs 306 and 308. Producer NFs 302 and 304 are members of NF set-1. Producer NFs 306 and 308 are members of NF set-2. In this example, producer NF 302 and producer NF 306 are equivalent, and producer NF 304 and 308 are equivalent. In this context, "equivalent" means that the producer NFs are of the same NF type and have the same resources for providing the services provided by the NF type.

In the illustrated example, in step 1, consumer NF 300 generates and sends an initial NF discovery request to regional NRF $100_1$. In step 2, regional NRF $100_1$ receives the NF discovery request, determines that it cannot process the NF discovery request, and forwards the NF discovery request to root NRF 100R. In step 3, root NRF 100R performs NRF selection based on the query parameters in the NF discovery request, selects regional NRF $100_2$, and forwards the NF discovery request to regional NRF $100_2$. Regional NRF $100_2$ generates an NF discovery response including the NF profiles of producer NFs 302 and 304, which include the NF set identifier of NF set-1, and forwards the NF discovery response to root NRF 100R. Root NRF 100R forwards the NF discovery response to regional NRF $100_1$. In step 4, regional NRF $100_1$ forwards the NF discovery response to consumer NF 300.

Figure 4:
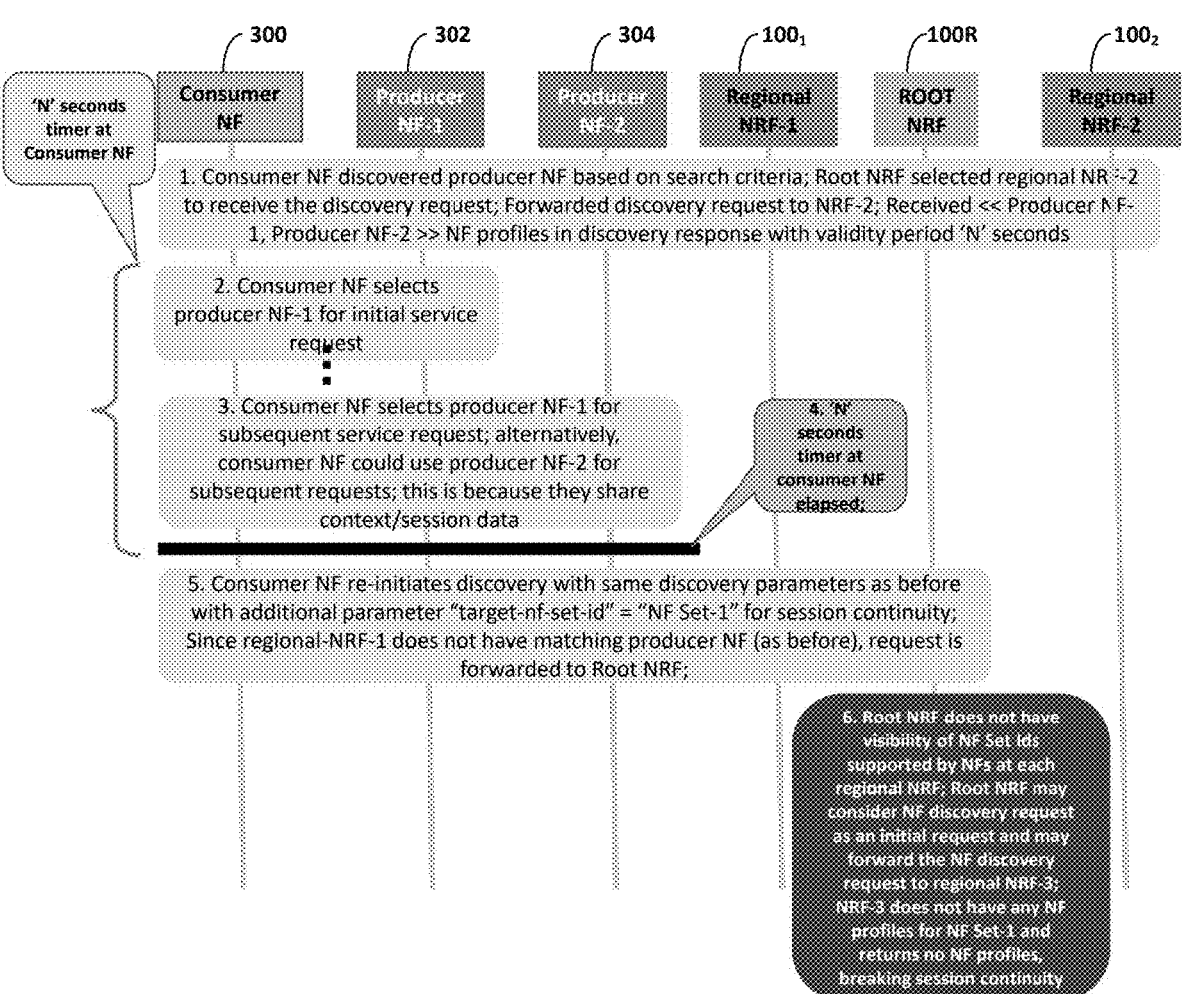
FIG. 4 is a message flow diagram illustrating a problem that can occur in a hierarchical NRF deployment when the root NRF lacks NF set information for NFs registered with regional NRFs.

FIG. 4 is a message flow diagram illustrating a problem that can occur in a hierarchical NRF deployment when the root NRF lacks NF set information for NFs registered with regional NRFs. The transactions/messages illustrated in FIG. 4 assume that the initial NF discovery transaction illustrated in FIG. 3 has occurred. Step 1 in FIG. 4 summarizes the results of the NF discovery transaction from FIG. 3, i.e., that consumer NF 300 discovered the NF profiles of producer NFs 302 and 304 because root NRF forwarded the NF discovery request to regional NRF $100_2$, which generated the discovery response. The discovery response also includes a validity period. When the validity period expires, consumer NF 300 must refresh the NF discovery results by re-querying regional NRF $100_1$.

In step 2, consumer NF 300 selects producer NF 302 for an SBI request. Consumer NF 300 must send subsequent SBI request associated with the same session to producer NF 302 or other members of NF set-1. In FIG. 4, producer NF 304 is the only other member of NF-set-1. Accordingly, consumer NF 300 may interchangeably send subsequent requests associated with the same session to producer NFs 302 and 304 for load balancing or if one of producer NFs 302 and 304 fails.

In step 4, N seconds have elapsed, where N is equal to the validity period of the NF discovery results. Accordingly, in step 5, consumer NF 300 re-initiates the NF discovery request with the same discovery query parameters as the initial NF discovery request, except that consumer NF 300 adds the NF discovery query parameter target-NF-set-id=NF set-1 to the NF discovery request. Regional NRF $100_1$ does not have NF profiles that match the query parameters (as with the initial NF discovery request), so regional NRF $100_1$ forwards the NF discovery request to root NRF 100R.

In step 6, root NRF 100R receives the NF discovery request, but root NRF does not have visibility of the NF set Ids of the producer NFs registered with the regional NRFs. Without visibility of the NF set Ids, root NRF 100R would need to ignore target-nf-set-id query parameter and determine the target regional NRF based on the search parameters other than the NF set Id. When this happens, root NRF 100R may select a regional NRF not supporting the producer NFs in the NF set identified by the target-nf-set-id. When root NRF 100R forwards the NF discovery request to a regional NRF that does not support producer NFs in the target NF set, the regional NRF will return no matching NF profiles. When this occurs, root NRF 100R may be required to re-route the request again to another regional NRF. One disadvantage of this inefficient regional NRF selection mechanism is transaction latency. Session continuity can also be broken, meaning that the session supported by producer NF 302 may time out due to the latency introduced by unsuccessful regional NRF selection.

Figure 5:
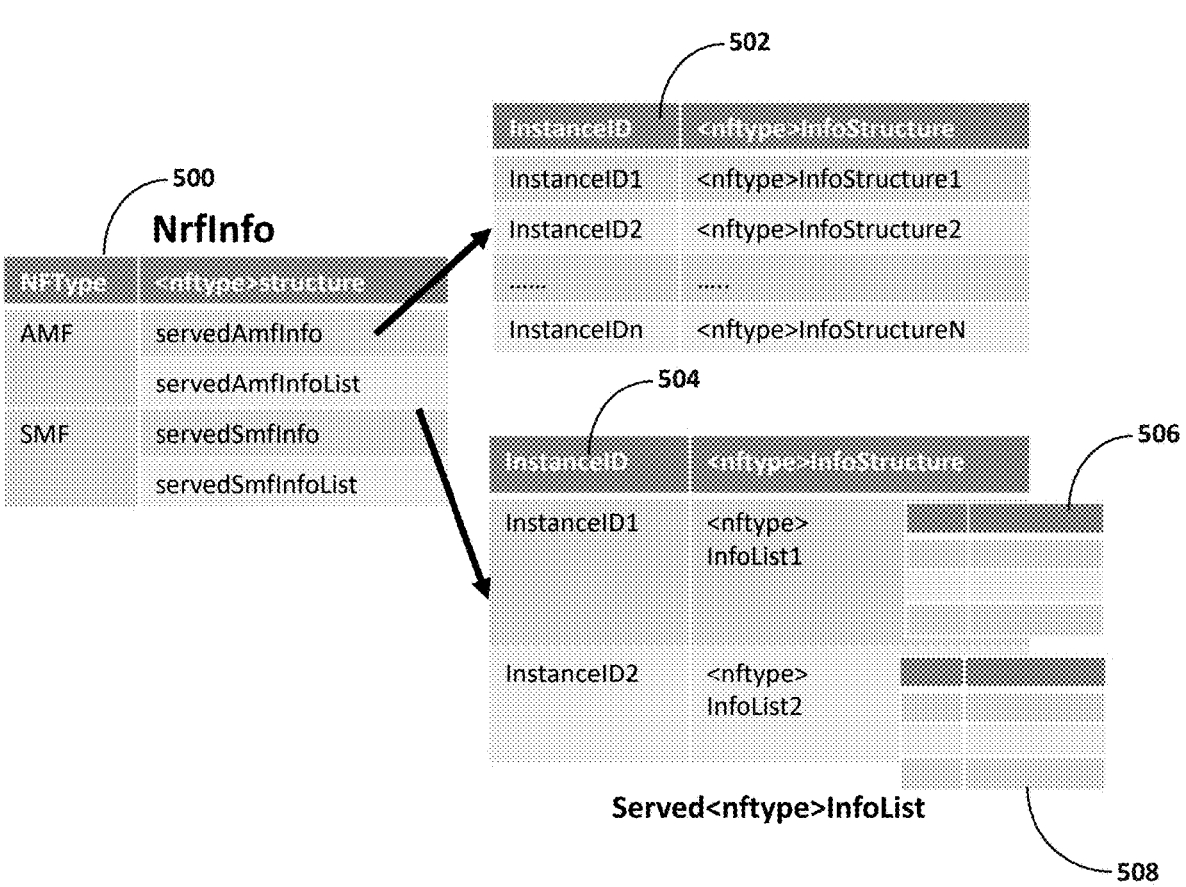
FIG. 5 illustrates data structure diagrams of data structures that can be used to communicate an nfSetIdList to a root NRF.

To address the difficulty described with respect to FIGS. 2 and 3, regional NRFs may share an additional attribute, referred to herein as the nfSetIdList, when synching with the root NRF. The nfSetIdList attribute shared by each regional NRF will include the NF set Ids of producer NFs registered or configured with each regional NRF. In one example, the nfSetIdList attribute may be communicated to the root NRF by embedding the nfSetIdList attribute in the NrfInfo structure (defined in 3GPP TS 29.510 in NF Profile) as part of the NfInfo structure for each NF whose NfInfo structure is included in the NrfInfo structure. FIG. 5 illustrates the embedding of the nfSetIdList in the NrfInfo structure. In FIG. 5, NrfInfo structure 500 includes an <nftype> structure for each NF type served by the NRF. The <nftype> structure for each configured NF type includes a served<nftype>Info structure and a served<nftype>InfoList. Each served<nftype>Info structure 502 includes NF instance Ids and an <nftype>InfoStructure corresponding to each of the NF instance IDs. Each served<nftype>InfoList 504 includes NF instance IDs and an <nftype>InfoList 506 or 508 corresponding to each NF instance ID. The nfSetIdList attribute may be included as an <nftype>InfoList for each NF instance ID. Table 1 shown below illustrates an exemplary structure for the nfSetIdList attribute.

TABLE 1

| Custom Structure for nfSetIdList | | | |
|---|---|---|---|
| Fields | Type | Cardinality | Description |
| nfSetIdList | Array(NfSetId) | 0 . . . 1 | List of NF Set Ids supported by this NF instance |

As illustrated in Table 1, the nfSetIdList is a custom structure that carries the NF set Id(s) supported by an NF instance. The nfSetIdList may be embedded with the <nftype>InfoStructure as follows:

```
<nftype>Info
{
    <<3GPP-defined JSON attributes>>
    <<Custom nfSetIdList (see Table 1)>>
}
```

To summarize, the regional NRFs may communicate to the root NRF the NF set Ids of each NF instance registered with the regional NRFs using the nfSetIdList, which may be embedded in the <nftype>Info structure, which may in turn be embedded in the NrfInfo structure. The NrfInfo structure may be communicated by the regional NRFs to the root NRF in NF register, NF update, NF heart-beat, and/or NF status notify request messages.

In an alternate implementation to communicating the nfSetIdList in the NrfInfo structure, the nfSetIdList may be communicated as a separate map-type structure, referred to herein as the nfProfileInfoList. Table 2 shown below illustrates the nfProfileInfoList structure.

TABLE 2

| Custom nfProfileInfoList Structure | | | |
|---|---|---|---|
| Fields | Type | Cardinality | Description |
| nfProfileInfoList | Map (CustomInfo) | 0 . . . N | Map of CustomInfo where NF instance Id attribute in NF profile is key to the map |

From Table 2, the nfProfileInfoList structure may carry one or more custom structures mapped to the NF instance Id of a producer NF. One of the custom structures may be the NfSetIdList illustrated in Table 1. The custom nfProfileInfoList structure including the nfSetIdList may be communicated by the regional NRFs to the root NRF in NF register, NF update, NF heart-beat, and/or NF status notify request messages.

Figure 6:
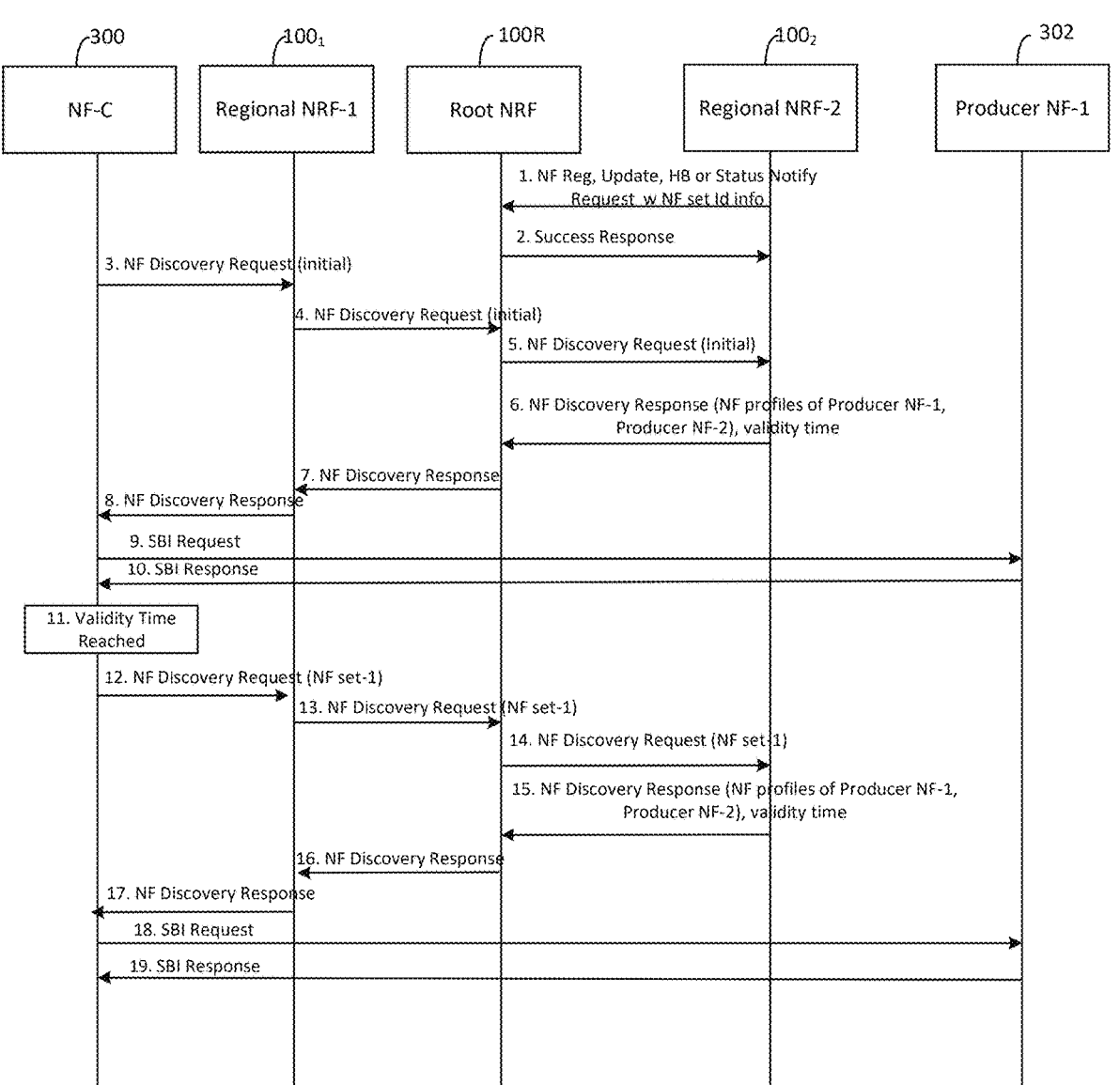
FIG. 6 is a message flow diagram illustrating the communication of NF set information from a regional NRF to the root NRF and the use of the NF set information to perform intermediate NRF forwarding of an NF discovery request that specifies an NF set Id as a query parameter.

When the root NRF has the NF set information of producer NFs registered with regional NRFs, the likelihood that the root NRF will select a regional NRF that supports producer NFs that support an ongoing session is increased. FIG. 6 is a message flow diagram illustrating the communication of NF set information from a regional NRF to the root NRF and the use of the NF set information to perform intermediate NRF forwarding of an NF discovery request that specifies an NF set Id as a query parameter. Referring to FIG. 6, in step 1, regional NRF 100₂ sends an NF register request, an NF update request, an NF heart-beat request, or an NF status notify request with NF set identification information to root NRF 100R. The NF set identification information may be carried in the NrfInfo structure or in a separate custom structure as described above. The NF set identification information includes the NF set identifiers of producer NFs located in the region served by regional NRF 100₂. Root NRF 100R stores the NF set identification information in the NF profiles/state database 212 of root NRF 100R. In step 2, root NRF 100R generates and sends a success response to regional NRF 100₂.

In step 3, NF service consumer 300 sends an initial NF discovery request to regional NRF 100₁. In step 4, regional NRF 100₁ forwards the NF discovery request to root NRF 100R. Root NRF 100R determines that root NRF 100R does not have NF profiles of producer NFs that match the query parameters in the NF discovery request and identifies regional NRF 100₂ as having the NF profiles that match the query parameters. Accordingly, in step 5, root NRF 100R functions as an intermediate forwarding NRF and forwards the NF discovery request to regional NRF 100₂. In step 6, regional NRF 100₂ accesses the NF profiles/state database 212 of regional NRF 100₂, locates the NF profiles of producer NF 302 and producer NF 304 and sends the NF profiles to root NRF 100R in an NF discovery response. The NF discovery response also includes a validity time for the NF discovery results. In step 7, root NRF 100R sends the NF discovery response regional NRF 100₁. In step 8, regional NRF 100₁ forwards the NF discovery response to NF service consumer 300.

In step 9, NF service consumer 300 uses the NF profiles received in the NF discovery response to perform producer NF selection, selects producer NF 302, and transmits an SBI request to producer NF 302. Producer NF 302 processes the SBI request and, in step 10, generates and sends an SBI response to NF service consumer NF 300.

In step 11, the validity time for the NF discovery results in received in step 8 is reached. Accordingly, in step 12, NF service consumer 300 generates and sends and NF discovery request to regional NRF 100₁ to refresh the NF discovery results. The discovery request includes the NF set identifier of NF set-1, which is the NF set of producer NF 302 that processed the SBI request in step 9. In step 13, regional NRF 100₁ forwards the NF discovery request to root NRF 100R. Root NRF 100R uses the NF set identifier received in the NF discovery request to access the NF profiles/state database 212 of root NRF 100R and identifies regional NRF 100₂ as having NF profiles of producer NFs that are members of the NF set identified by the NF set identifier. In step 14, root NRF 100R forwards the NF discovery request to regional NRF 100₂.

Regional NRF 100₂ receives the NF discovery request and uses the NF set identifier and the other query parameters to access NF profiles/state database 212 of regional NRF 100₂ and locates the NF profiles of producer NFs 302 and 304 as NF set members that match the NF set Id and the remaining query parameters in the NF discovery request. In step 15, regional NRF 100₂ generates and sends an NF discovery response with the NF profiles of producer NFs 302 and 304 and a new validity time and sends the NF discovery response to root NRF 100R. In step 16, root NRF 100R sends the NF discovery response to regional NRF 100₁. In step 17, regional NRF 100₁ forwards the NF discovery response to NF service consumer 300.

NF service consumer 300 performs producer NF selection using the NF discovery results received in step 17 and selects producer NF 302 to process a subsequent SBI request for the same session as the SBI request in step 9. In step 18, NF service consumer 300 sends the SBI request to producer NF 302. Because producer NF 302 is a member of the NF set that processed the initial SBI request in step 9, session continuity is preserved. In step 19, producer NF 302 generates and sends an SBI response to NF service consumer 300.

Figure 7:
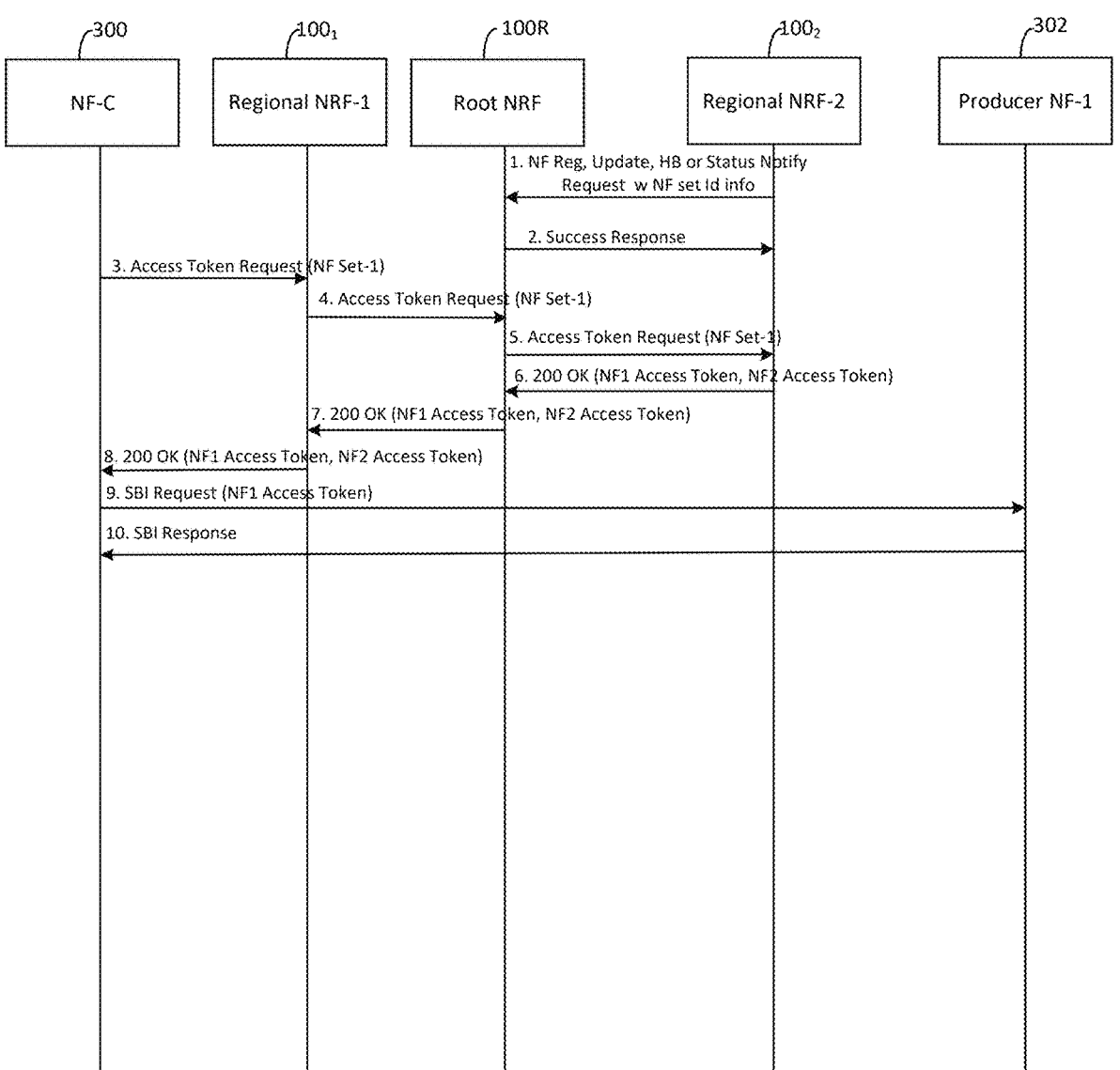
FIG. 7 is a message flow diagram illustrating the communication of NF set information from a regional NRF to the root NRF and the use of the NF set information to perform intermediate NRF forwarding of an access token request that specifies an NF set Id as a parameter.

FIG. 7 is a message flow diagram illustrating the communication of NF set information from a regional NRF to the root NRF and the use of the NF set information perform intermediate NRF forwarding of an access token request that specifies an NF set Id as a parameter. Referring to FIG. 7, in step 1, regional NRF $100_2$ sends an NF register request, an NF update request, an NF heart-beat request, or an NF status notify request with NF set identification information to root NRF 100R. The NF set identification information may be carried in the NrfInfo structure or in a separate custom structure as described above. The NF set identification information includes the NF set identifiers of producer NFs located in the region served by regional NRF $100_2$. Root NRF 100R stores the NF set identification information in the NF profiles/state database 212 of root NRF 100R. In step 2, root NRF 100R generates and sends a success response to regional NRF $100_2$.

In step 3, NF service consumer 300 sends an access token request to regional NRF $100_1$. The access token request may be an OAuth 2.0 access token request as defined in section 5.4 of 3GPP TS 29.510. The access token request includes the NF set identifier of NF set-1 as the expected NF set of the NF service producers whose access token are being sought. In step 3, regional NRF $100_1$ forwards the access token request to root NRF 100R. Root NRF 100R determines, using the NF set identification information received in step 1, that regional NRF $100_2$ supports the producer NFs corresponding to the NF set identifier identified in the access token request. Accordingly, in step 5, root NRF 100R functions as an intermediate forwarding NRF and forwards the access token request to regional NRF $100_2$. In step 6, regional NRF $100_2$ accesses the NF profiles/state database 212 of regional NRF $100_2$, locates the access tokens of producer NF 302 and producer NF 304 and sends the access tokens to root NRF 100R in an access token response. In step 7, root NRF 100R sends the access token response to regional NRF $100_1$. In step 8, regional NRF $100_1$ forwards the access token response NF service consumer 300.

In step 9, NF service consumer 300 sends an SBI request to producer NF 302. The SBI request includes the access token of producer NF 302. In step 10, producer NF 302 validates the access token and generates and sends an SBI response to NF service consumer 300. Because the root NRF has NF set information of producer NFs served by regional NRFs, the root NRF can send access token requests that identify NF sets to the correct regional NRFs, avoiding multiple retries and decreasing SBI transaction latency.

Figure 8:
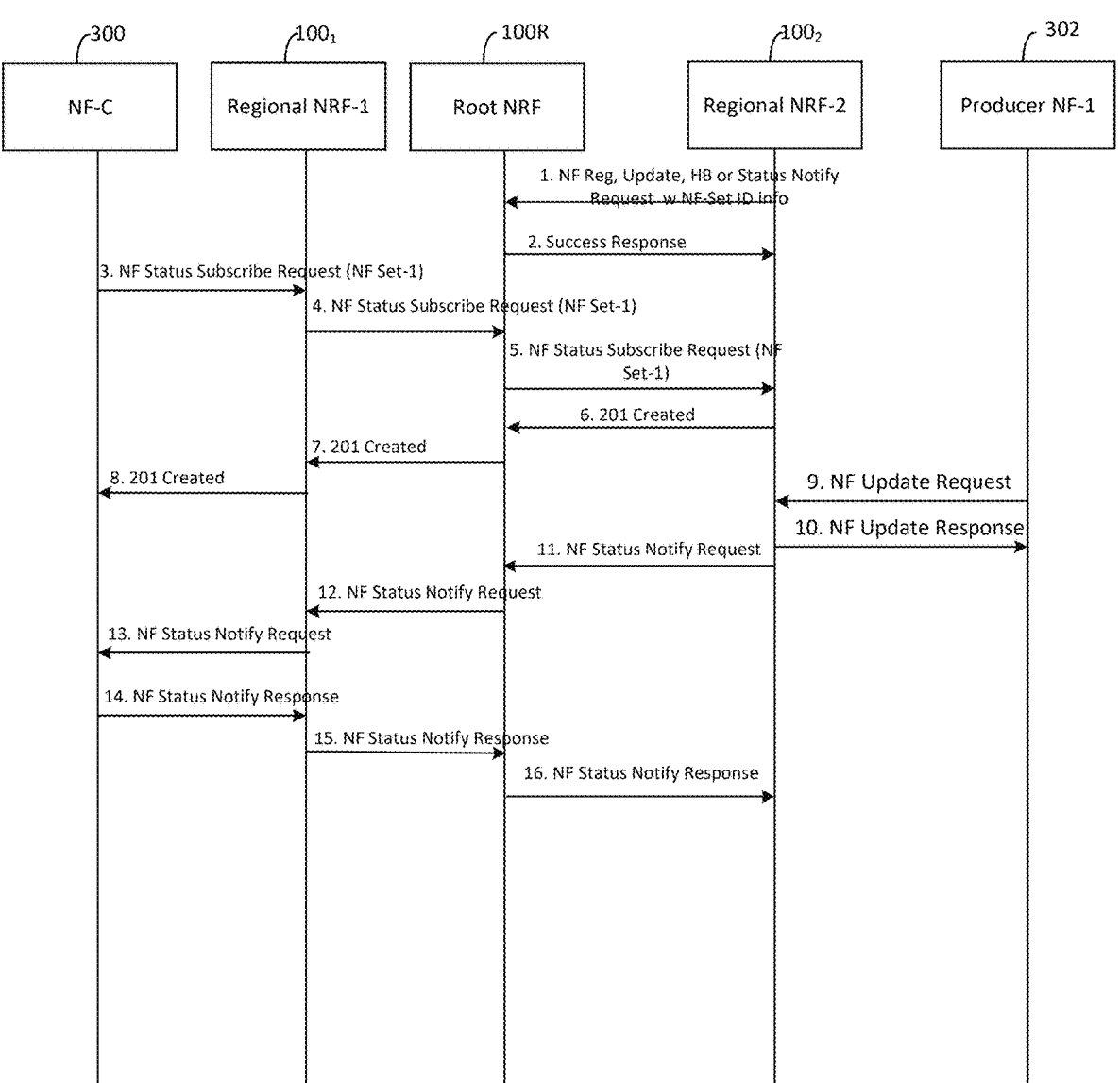
FIG. 8 is a message flow diagram illustrating the communication of NF set information from a regional NRF to the root NRF and the use of the NF set information to perform intermediate NRF forwarding of an NF status subscribe request that specifies an NF set Id as a subscription identifying parameter.

FIG. 8 is a message flow diagram illustrating the communication of NF set information from a regional NRF to the root NRF and the use of the NF set information to perform intermediate NRF forwarding of an NF status subscribe request that specifies an NF set Id as a subscription-identifying parameter. Referring to FIG. 8, in step 1, regional NRF $100_2$ sends an NF register request, an NF update request, an NF heart-beat request, or an NF status notify request with NF set identification information to root NRF 100R. The NF set identification information may be carried in the NrfInfo structure or in a separate custom structure as described above. The NF set identification information includes the NF set identifiers of producer NFs located in the region served by regional NRF $100_2$. Root NRF 100R stores the NF set identification information in the NF profiles/state database 212 of root NRF 100R. In step 2, root NRF 100R generates and sends a success response to regional NRF $100_2$.

In step 3, NF service consumer 300 sends an NF status subscribe request to regional NRF $100_1$. The NF status subscribe request may be a request to create a subscription to be notified of NF profile registrations, deregistrations, or modifications, as defined in Section 5.2.2.5 of 3GPP TS 29.510. In the illustrated example, the NF status subscribe request includes the NF set identifier of NF set-1 as a subscription identifying parameter. In step 4, regional NRF $100_1$ sends the NF status subscribe request to root NRF 100R. Root NRF 100R determines, using the NF set identification information received in step 1, that regional NRF $100_2$ supports the producer NFs corresponding to the NF set identifier identified in the NF status subscribe request. Accordingly, in step 5, root NRF 100R functions as an intermediate forwarding NRF and forwards the NF status subscribe request to regional NRF $100_2$. In step 6, regional NRF $100_2$ creates the subscription and sends a 201. Created message confirming successful creation of the subscription to root NRF 100R. In step 7, root NRF 100R forwards the 201. Created message to regional NRF $100_1$. In step 8, regional NRF $100_1$ forwards the 201. Created message to NF service consumer 300.

In step 9, producer NF 302 sends an NF update request to regional NRF $100_2$. In step 10, regional NRF $100_2$ updates the NF profile of producer NF 302 and sends an NF update response to producer NF 302. In step 11, regional NRF $100_2$ sends an NF status notify request message with the updated NF profile of producer NF 302 to root NRF 100R. In step 12, root NRF 100R forwards the NF status notify request message to regional NRF $100_1$. In step 13, regional NRF $100_1$ forwards the NF status notify request to service consumer 300. In step 14, NF service consumer 300 sends a success response message to regional NRF $100_1$. In step 15, regional NRF $100_1$ forwards the NF status notify response to root NRF 100R. In step 16, root NRF 100R forwards the NF status notify response to regional NRF $100_2$. Because the root NRF 100R has NF set information of producer NFs served by regional NRFs, the root NRF can send NF status subscribe requests that identify NF sets to the correct regional NRFs, avoiding multiple retries and decreasing SBI transaction latency.

Figure 9:
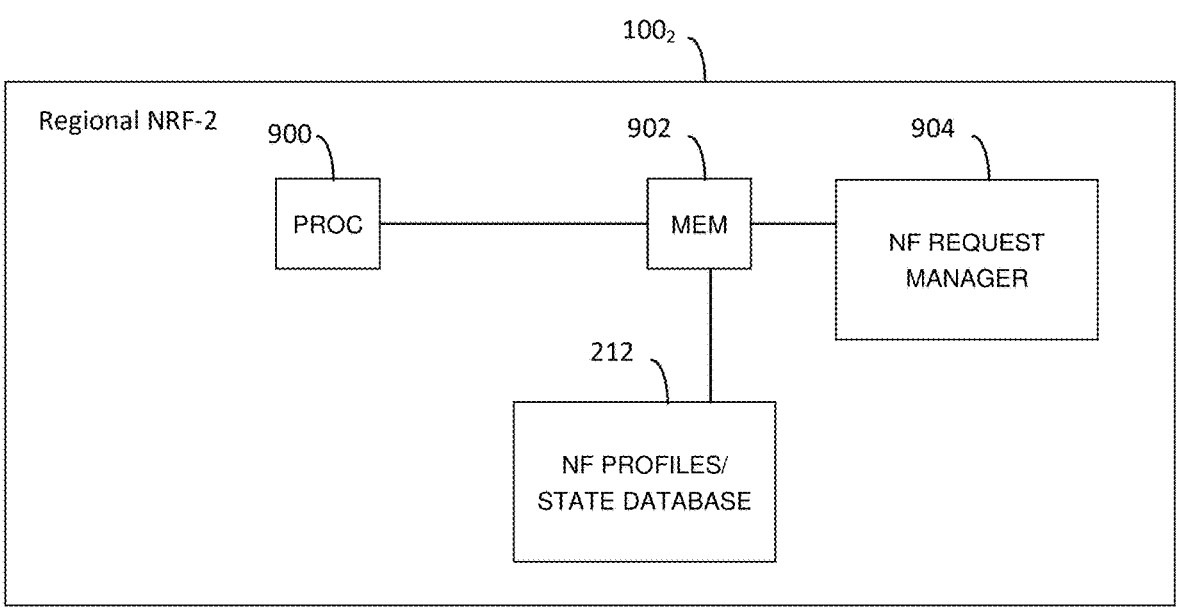
FIG. 9 is a block diagram illustrating exemplary architectures for a root NRF and a regional NRF for sharing and using NF set information in a hierarchical NRF deployment.
Figure 9:
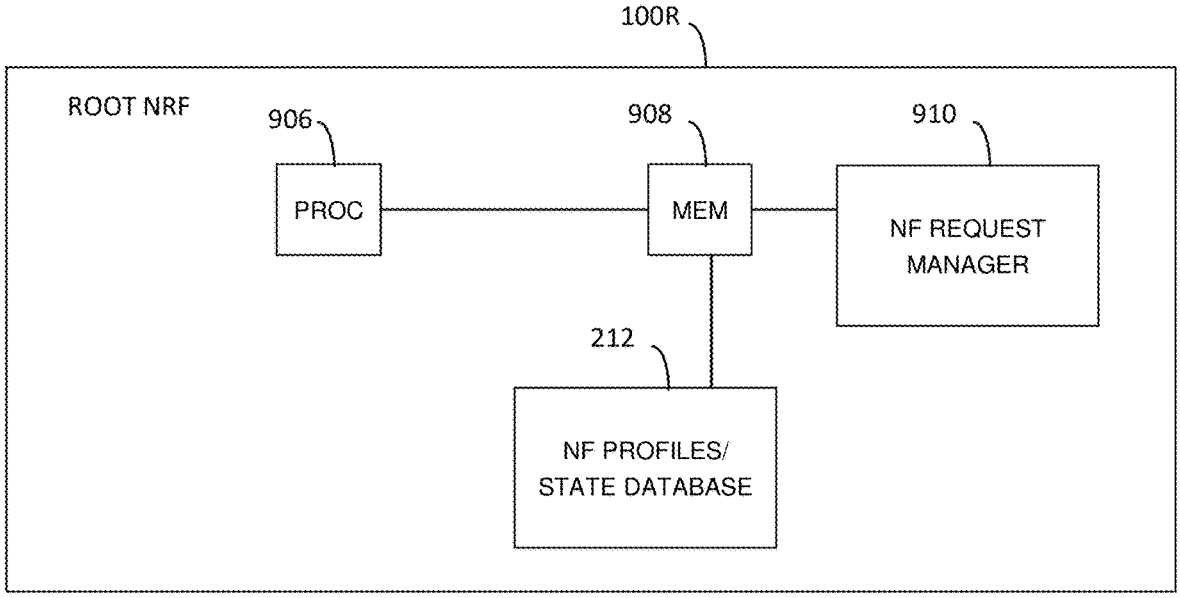

FIG. 9 is a block diagram illustrating exemplary architectures for a root NRF and a regional NRF for sharing NF set information in a hierarchical NRF deployment. Referring to FIG. 9, regional NRF $100_2$ includes at least one processor 900 and memory 902. Regional NRF $100_2$ includes NF profile/state database 212 that stores NF profiles and state information of producer NFA registered with NRF 102. Regional NRF $100_2$ also includes an NF request manager 904 for generating and processing NF request messages. NF profiles/state database 212 may store the custom NfSetIdList used to store NF set Id information of producer NFs registered with regional NRF $100_2$. NF request manager 904 may handle communication of the NF set identification information to root NRF 100R in SBI request messages, such as NF register request messages, NF update request messages, NF heart-beat request messages, and NF status notify request messages. NF request manager 904 may be implemented using computer executable instructions stored in memory 902 and executed by processor 900.

Root NRF 100R includes at least one processor 906 and memory 908. Root NRF 100R also includes NF profiles/state database 212 that stores NF profiles and state information received from regional NRF, such as regional NRF 102. NF profiles/state database 212 of root NRF 100R may store the nfSetIdLists received from regional NRFs, such as regional NRF $100_2$. Root NRF 100R includes an NF request manager 910 that processes and generates SBI request messages. NF request manager 910 of root NRF 100R may receive NF register, NF heart-beat, NF update, and NF status notify messages from regional NRFs, such as regional NRF $100_2$ including the NF set identification information and store the NF set identification information in NF profiles/state database 212. NF request manager 910 may use the NF set identification information to assist root NRF 100R in functioning as an intermediate forwarding NRF and identify the proper target regional NRF for SBI request messages, such as NF discovery and access token request messages. NF request manager 910 may be implemented using computer executable instruction stored in memory 908 and executed by processor 906.

Figure 10:
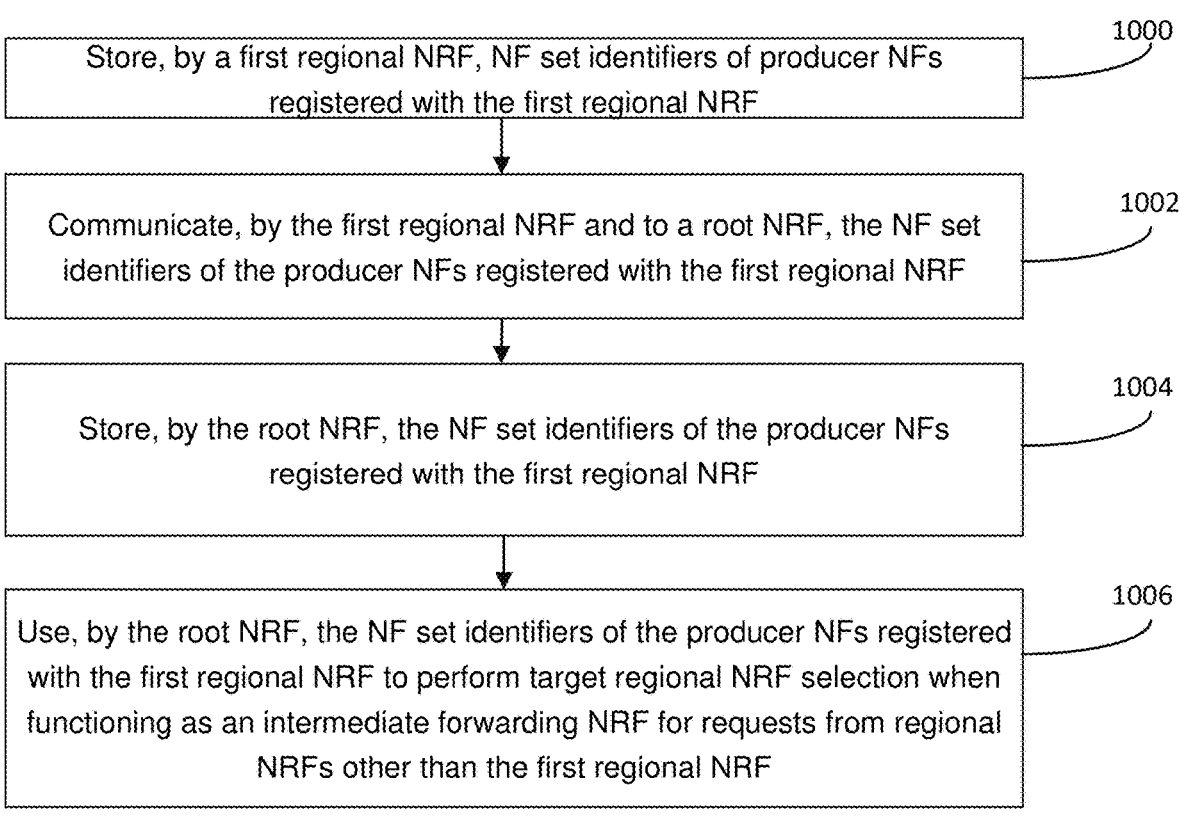
FIG. 10 is a flow chart illustrating an exemplary process for sharing and using NF set information in a hierarchical NRF deployment.

FIG. 10 is a flow chart illustrating an exemplary process for sharing and using NF set information in a hierarchical NRF deployment. Referring to FIG. 10, in step 1000, the process storing, by a first regional NRF, NF set identifiers of producer NFs registered with the first regional NRF. For example, a regional NRF, such as regional NRF $100_2$, may store, in its NF profiles/state database, NF profiles of producer NFs registered with the regional NRF. The NF profiles may include NF set identification information of the producer NFs registered with the first regional NRF.

In step 1002, the process further includes communicating, by the first regional NRF and to a root NRF, the NF set identifiers of the producer NFs registered with the first regional NRF. For example, a regional NRF, such as regional NRF $100_2$ may generate nfSetIdLists including the NF set Ids and corresponding NF instance Ids of producer NFs registered with the regional NRFs. The regional NRFs may either embed the nfSetIdLists in NrfInfo structures or custom structures. The regional NRFs may add the nfSetIdLists to 3GPP-defined SBI request messages, such as NF register request messages, NF update request messages, NF heart-beat request messages, and NF status notify request messages and transmit the messages to the root NRF.

In step 1004, the process further includes storing, by the root NRF, the NF set identifiers of the producer NFs registered with the first regional NRF. For example, a regional NRF, such as root NRF 100R, may store the NF set identifiers of the producer NFs registered with the regional NRFs in the NF profiles/state database of root NRF 100R.

In step 1006, the process further includes using, by the root NRF, the NF set identifiers of the producer NFs registered with the first regional NRF to perform target regional NRF selection when functioning as an intermediate forwarding NRF for requests from regional NRFs. For example, a root NRF, such as root NRF 100R, may use the NF set IDs to perform target regional NRF selection when forwarding NF discovery requests, NF access token requests and NF status subscribe requests to the first regional NRF.

Exemplary advantages of the subject matter described herein include decreased latency in intermediate NRF forwarding operations. Because the root NRF has the NF set information of producer NFs registered with the regional NRFs, the likelihood of routing an NF discovery or access token request to a regional NRF that does not support producer NFs that match the NF set information is reduced.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Services and System Aspects; System Architecture for the 5G System (5GS); Stage 2 (Release 18) 3GPP TS 23.501 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for communicating and using network function (NF) set identifiers in hierarchical NF repository function (NRF) deployments, the method comprising:
   storing, by a first regional NRF, NF set identifiers of producer NFs registered with the first regional NRF;
   communicating, by the first regional NRF and to a root NRF, the NF set identifiers of the producer NFs registered with the first regional NRF;
   storing, by the root NRF, the NF set identifiers of the producer NFs registered with the first regional NRF; and
   using, by the root NRF, the NF set identifiers of the producer NFs registered with the first regional NRF to perform target regional NRF selection when functioning as an intermediate forwarding NRF for requests from regional NRFs.

2. The method of claim 1 comprising receiving, by the first regional NRF, NF register request messages from producer NFs located in a region served by the first regional NRF, reading NF profiles including the NF set identifiers from the NF register request messages, and storing, by the first regional NRF, the NF set identifiers includes storing the NF profiles in memory of the first regional NRF.

3. The method of claim 1 wherein communicating the NF set identifiers to the root NRF comprises generating, by the first regional NRF, an NF register request message, adding, by the first regional NRF, the NF set identifiers to the NF register request message, and transmitting, by the first regional NRF and to the root NRF, the NF register request message including the NF set identifiers.

4. The method of claim 1 wherein communicating the NF set identifiers to the root NRF comprises generating, by the first regional NRF, an NF update or NF heart-beat request message, adding, by the first regional NRF, the NF set identifiers to the NF update or NF heart-beat request message, and transmitting, by the first regional NRF and to the root NRF, the NF update or NF heart-beat request message including the NF set identifiers.

5. The method of claim 1 wherein communicating the NF set identifiers to the root NRF comprises generating, by the first regional NRF, an NF status notify request message, adding, by the first regional NRF, the NF set identifiers to the NF status notify request message, and transmitting, by the first regional NRF and to the root NRF, the NF status notify request message including the NF set identifiers.

6. The method of claim 1 wherein communicating the NF set identifiers to the root NRF includes generating an nfSetIdList including the NF set identifiers, embedding the nfSetIdList in an NrfInfo structure, adding the NrfInfo structure to a request message to be transmitted to the root NRF, and transmitting the request message including the NrfInfo structure from the first regional NRF to the root NRF.

7. The method of claim 1 wherein communicating the NF set identifiers to the root NRF includes generating an nfSetIdList including the NF set identifiers, embedding the nfSetIdList in a custom structure, adding the custom structure to a request message to be transmitted to the root NRF and transmitting the request message including the custom structure from the first regional NRF to the root NRF.

8. The method of claim 1 wherein using, by the root NRF, the NF set identifiers of the producer NFs registered with the first regional NRF to perform target regional NRF selection when functioning as an intermediate forwarding NRF for requests from regional NRFs includes:

receiving, by the root NRF, an NF discovery request message from a second regional NRF, the NF discovery request message including, as a query parameter, an NF set identifier;

determining, by the root NRF and using the NF set identifier in the NF discovery request message and the NF set identifiers received from the first regional NRF, that a producer NF registered with the first regional NRF is a member of an NF set corresponding to the NF set identifier received in the NF discovery request message; and forwarding, by the root NRF, the NF discovery request message to the first regional NRF.

9. The method of claim 1 wherein using, by the root NRF, the NF set identifiers of the producer NFs registered with the first regional NRF to perform target regional NRF selection when functioning as an intermediate forwarding NRF for requests from regional NRFs includes:

receiving, by the root NRF, an access token request message from a second regional NRF, the access token request message including an NF set identifier;

determining, by the root NRF and using the NF set identifier in the access token request message and the NF set identifiers received from the first regional NRF, that a producer NF registered with the first regional NRF is a member of an NF set corresponding to the NF set identifier received in the access token request message; and forwarding, by the root NRF, the access token request message to the first regional NRF.

10. The method of claim 1 wherein using, by the root NRF, the NF set identifiers of the producer NFs registered with the first regional NRF to perform target regional NRF selection when functioning as an intermediate forwarding NRF for requests from regional NRFs includes:

receiving, by the root NRF, an NF status subscribe request message from a second regional NRF, the NF status subscribe request message including, as a subscription identifying parameter, an NF set identifier;

determining, by the root NRF and using the NF set identifier in the NF status subscribe request message and the NF set identifiers received from the first regional NRF, that a producer NF registered with the first regional NRF is a member of an NF set corresponding to the NF set identifier received in the NF status subscribe request message; and forwarding, by the root NRF, the NF status subscribe request message to the first regional NRF.

11. A system for communicating and using network function (NF) set identifiers in hierarchical NF repository function (NRF) deployments, the system comprising:

a first regional NRF including at least one processor and a memory, the first regional NRF for storing, in the memory, NF set identifiers of producer NFs registered with the first regional NRF and communicating the NF set identifiers of the producer NFs registered with the first regional NRF; and a root NRF including at least one processor and a memory, the root NRF for receiving, from the first regional NRF, the NF set identifiers of the producer NFs registered with the first regional NRF and using the NF set identifiers of the producer NFs registered with the first regional NRF to perform target regional NRF selection when functioning as an intermediate forwarding NRF for requests from regional NRFs.

12. The system of claim 11 wherein the first regional NRF is configured to communicate the NF set identifiers to the root NRF by generating an NF register request message, adding the NF set identifiers to the NF register request message, and transmitting, to the root NRF, the NF register request message including the NF set identifiers.

13. The system of claim 11 wherein the first regional NRF is configured to communicate the NF set identifiers to the root NRF by generating an NF update or NF heart-beat request message, adding the NF set identifiers to the NF update or NF heart-beat request message, and transmitting, to the root NRF, the NF update or NF heart-beat request message including the NF set identifiers.

14. The system of claim 11 wherein the first regional NRF is configured to communicate the NF set identifiers to the root NRF by generating an NF status notify request message, adding the NF set identifiers to the NF status notify request message, and transmitting, to the root NRF, the NF status notify request message including the NF set identifiers.

15. The system of claim 11 wherein the first regional NRF is configured to communicate the NF set identifiers to the root NRF by generating an nfSetIdList including the NF set identifiers, embedding the nfSetIdList in an NrfInfo structure, adding the NrfInfo structure to a request message to be transmitted to the root NRF and transmitting the request message including the NrfInfo structure from the first regional NRF to the root NRF.

16. The system of claim 11 wherein the first regional NRF is configured to communicate the NF set identifiers to the root NRF by generating an nfSetIdList including the NF set identifiers, embedding the nfSetIdList in a custom structure, adding the custom structure to a request message to be transmitted to the root NRF and transmitting the request message including the custom structure from the first regional NRF to the root NRF.

17. The system of claim 11 wherein the root NRF is configured to use the NF set identifiers of the producer NFs registered with the first regional NRF to perform target regional NRF selection when functioning as an intermediate forwarding NRF for requests from regional NRFs by:

receiving, by the root NRF, an NF discovery request message from a second regional NRF, the NF discovery request message including, as a query parameter, an NF set identifier;

determining, by the root NRF and using the NF set identifier in the NF discovery request message and the NF set identifiers received from the first regional NRF, that a producer NF registered with the first regional NRF is a member of an NF set corresponding to the NF set identifier received in the NF discovery request message; and forwarding, by the root NRF, the NF discovery request message to the first regional NRF.

18. The system of claim 11 wherein the root NRF is configured to use the NF set identifiers of the producer NFs registered with the first regional NRF to perform target regional NRF selection when functioning as an intermediate forwarding NRF for requests from regional NRFs by:

receiving an access token request message from a second regional NRF, the access token request message including an NF set identifier;

determining, using the NF set identifier in the access token request message and the NF set identifiers received from the first regional NRF, that a producer NF registered with the first regional NRF is a member of an NF set corresponding to the NF set identifier received in the access token request message; and forwarding the access token request message to the first regional NRF.

19. The system of claim 11 wherein the root NRF is configured to use the NF set identifiers of the producer NFs registered with the first regional NRF to perform target regional NRF selection when functioning as an intermediate forwarding NRF for requests from regional NRFs by:

receiving an NF status subscribe request message from a second regional NRF, the NF status subscribe request message including, as a subscription identifying parameter, an NF set identifier;

determining, using the NF set identifier in the NF status subscribe request message and the NF set identifiers received from the first regional NRF, that a producer NF registered with the first regional NRF is a member of an NF set corresponding to the NF set identifier received in the NF status subscribe request message; and forwarding the NF status subscribe request message to the first regional NRF.

20. A non-transitory computer readable medium having stored thereon computer-executable instructions that when executed by a processor of a computer control the computer to perform steps comprising:

storing, by a first regional network function (NF) repository function (NRF), NF set identifiers of producer NFs registered with the first regional NRF;

communicating, by the first regional NRF and to a root NRF, the NF set identifiers of the producer NFs registered with the first regional NRF;

storing, by the root NRF, the NF set identifiers of the producer NFs registered with the first regional NRF; and using, by the root NRF, the NF set identifiers of the producer NFs registered with the first regional NRF to perform target regional NRF selection when functioning as an intermediate forwarding NRF for requests from regional NRFs.

* * * * *